April 19, 1949.　　　　C. A. COBB　　　　2,467,425
BLOWER CONTROL
Filed April 15, 1948　　　　　　　　　　2 Sheets-Sheet 1
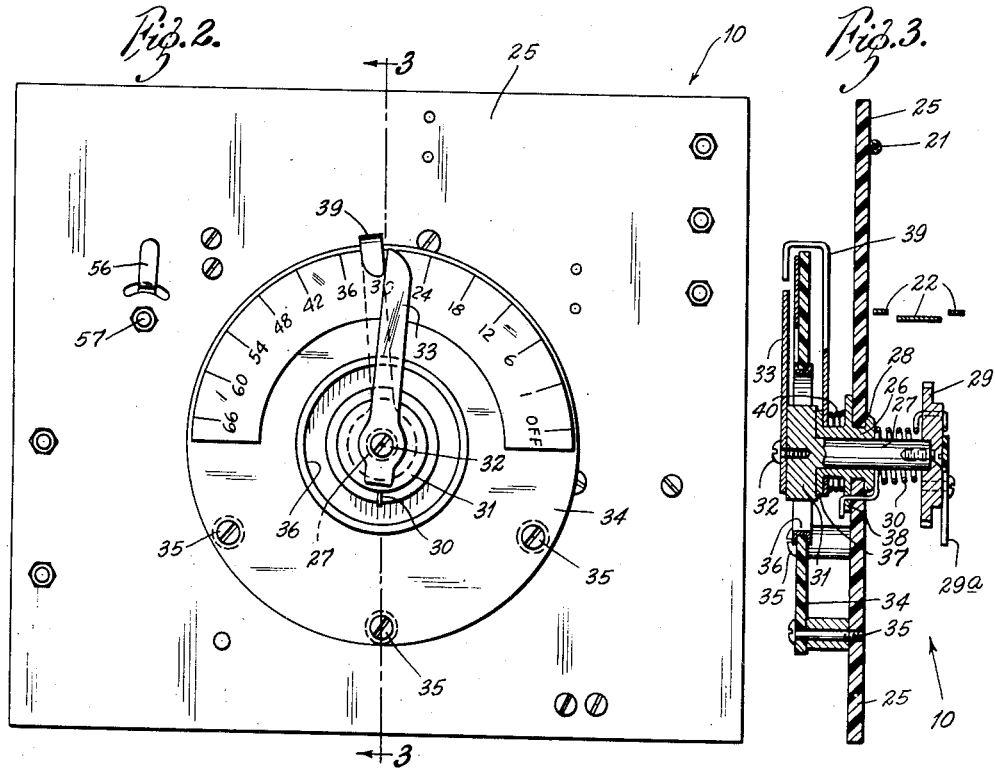
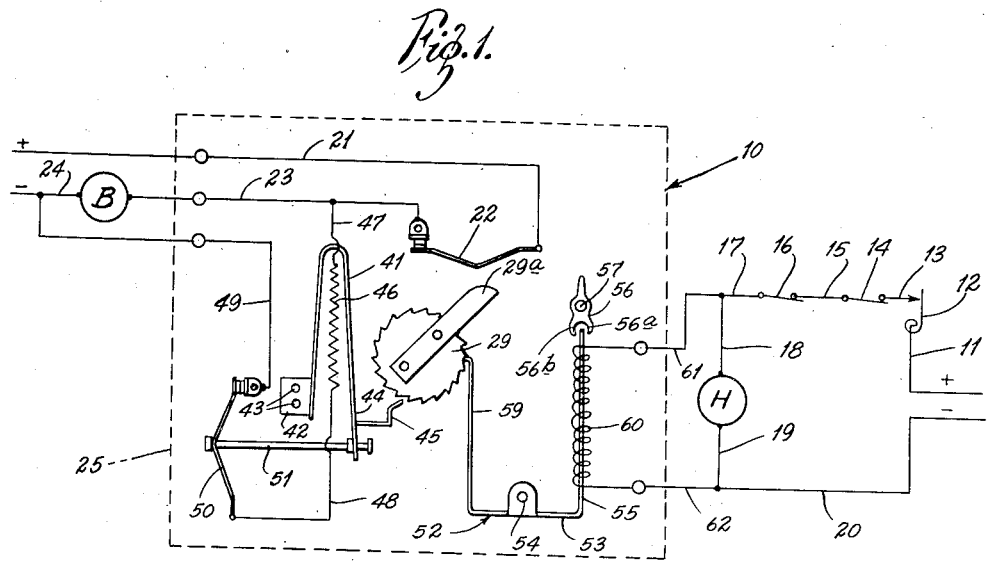
INVENTOR:
CLIFTON A. COBB
BY Charles E. Markham
AGENT.

April 19, 1949.    C. A. COBB    2,467,425
BLOWER CONTROL

Filed April 15, 1948    2 Sheets-Sheet 2

INVENTOR:
CLIFTON A. COBB
BY Charles E. Markham
AGENT.

Patented Apr. 19, 1949

2,467,425

UNITED STATES PATENT OFFICE 2,467,425

BLOWER CONTROL

Clifton A. Cobb, University City, Mo., assignor to Missouri Automatic Control Corporation, St. Louis, Mo., a corporation of Missouri Application April 15, 1948, Serial No. 21,110

12 Claims. (Cl. 219—39)

This invention relates to control systems for electrically operated blowers or circulators used in connection with space conditioning systems for circulating a heat change medium. It particularly relates to a control for a heating system blower which is to be operated continuously during operation of the heat-producer.

It is an object of the invention to provide a blower control for use in a heating system which will automatically start operation of the blower a predetermined time after the start of operation of an electrically operated or controlled heat-producer, continue operation of the blower during operation of the heat-producer, and automatically stop operation of the blower a predetermined time after cessation of operation of the heat-producer.

Another object is to provide a control of this character in which the time interval between cessation of operation of the heat-producer and the automatic stopping of blower operation may be conveniently varied.

Another object is to provide a control of this character in which the time interval between the start of operation of the heat-producer and the start of operation of the blower may be conveniently varied.

It is a further object to achieve these functions in a blower control by the use of a novel thermal timer which includes a pair of cooperating temperature responsive elements sensitive to electrically operated heaters one of which heaters is in the blower circuit and the other being in the heat-producer control circuit.

Other objects and and advantages will appear from the following complete description and accompanying drawings.

In the drawings,

Fig. 1 is a schematic illustration of a blower control constructed in accordance with the present invention.

Fig. 2 is a front view of the thermal timer shown schematically within the dotted outline in Fig. 1.

Fig. 3 is a sectional view of the timer shown in Fig. 2 taken on line 3—3 of Fig. 2.

Figure 4:
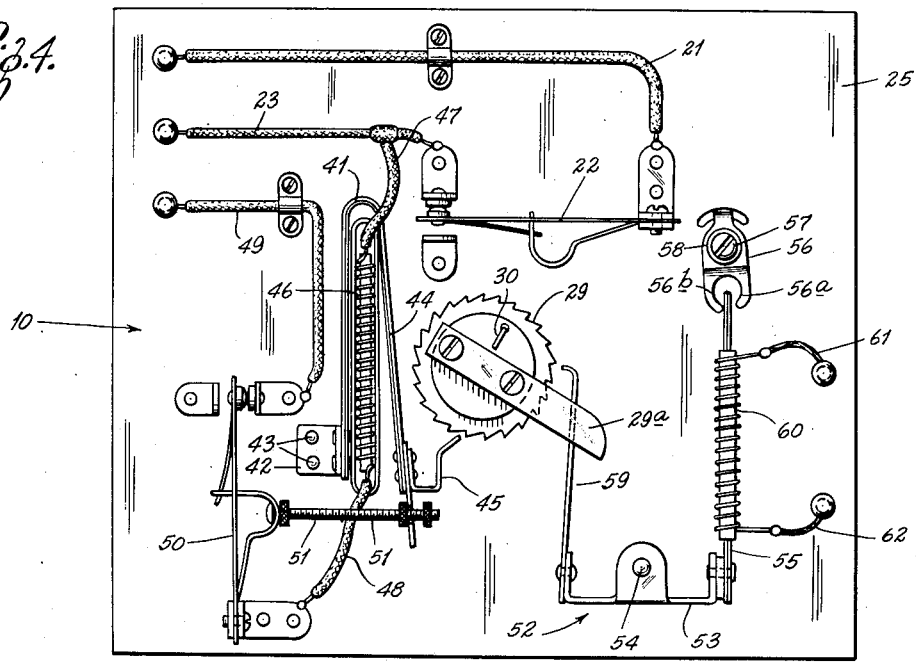
Fig. 4 is a rear view of the timer shown in Fig. 2. In this view the blower control switch and the heater control switch are shown closed, and the pawl is in a releasing position.

Referring to Fig. 1, the system includes as primary elements an electrically operated or electrically controlled heat-producer H, an electrically operated blower B, and a thermal timer for controlling the operation of the blower generally indicated at 10. An energizing and control circuit for the control of the heat-producer H is indicated and includes a lead 11, a space thermostat 12, a lead 13, a safety pilot switching device 14, a lead 15, a heat production limit switch 16, the leads 17 and 18, the heat-producer H and leads 19 and 20. An energizing and control circuit for the blower B is also indicated and includes the lead 21, the normally closed spring toggle switch 22, the lead 23, the blower B and the lead 24.

The thermal timing device comprises a panel member 25. Centrally mounted in the panel, see Fig. 3, is a sleeve 26 in which is journalled for rotation a shaft 27. The sleeve 26 is rigidly attached to the panel by riveting over as indicated at 28. Rigidly mounted on the rear end of shaft 27 is a ratchet wheel 29. There is a spring 30 surrounding shaft 27. The spring has one end anchored in the panel and it is so wound as to urge the shaft 27 and ratchet 29 in a counter-clockwise direction, as viewed in Fig. 2, and in a clockwise direction as viewed in Figs. 4 and 5. The front end of the shaft 27 is provided with a flange 31 which bears against the front end of the sleeve. The spring 30 has the further function of lightly urging the shaft rearwardly to insure the retention of the shaft in its proper position axially. Rigidly attached to the face of ratchet wheel 29 by any suitable means is a switch actuating arm 29a which, when the wheel 29 is rotated counterclockwise sufficiently, engages the normally closed switch 22 and opens it.

Rigidly attached to the front end of shaft 27 by a screw 32 is an indicator arm 33. There is a circular dial plate 34 attached to the front of panel 25 as by screws 35. The dial 34 is arranged concentric with relation to the shaft 27 and is provided with a central clearance aperture 36. The sleeve member 26 is provided with a front end flange 37 and an intermediate flange 38. There is an adjustable stop member 39 having its inner end fitted over the front end of sleeve 26 between flanges 37 and 38 and its outer end formed over the edge of the dial plate 34 and arranged to be engaged by the indicator arm 33. The stop member is held in frictional engagement with the inner face of flange 37 by a compression spring 40.

Figure 5:
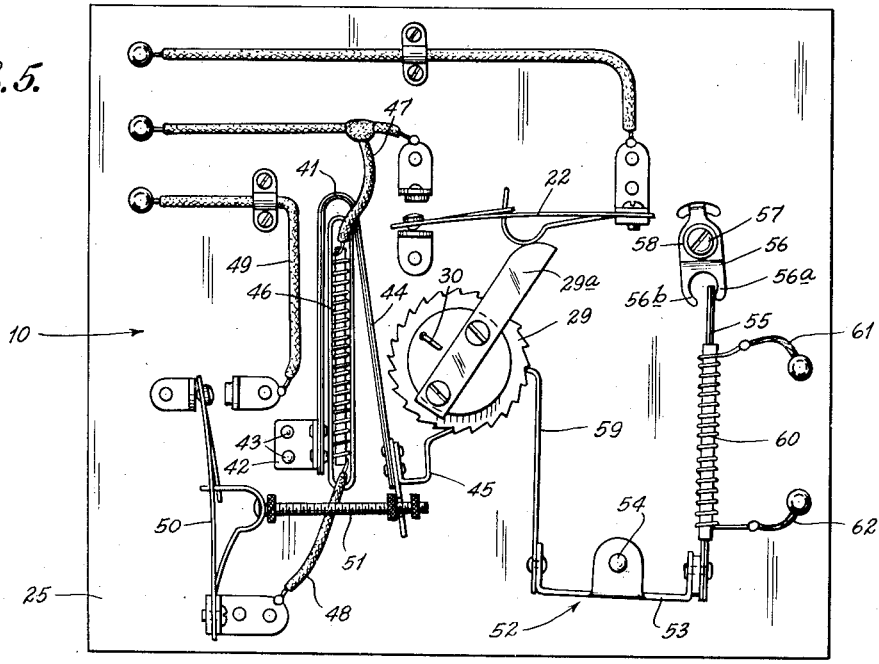
Fig. 5 is also a rear view of the timer shown in Fig. 2. In this view however, the blower control switch and heater control switch are being held open and the pawl is shown in an engaged position.

On the rear of the panel board, see Figs. 4 and 5, and to the left of ratchet wheel 29, is an inverted U form bimetal strip 41. The left leg of the strip is anchored at its lower left end to the panel board as by a bracket 42 and rivets 43. The right free leg 44 of the bimetal strip carries near its lower end a member 45 adapted to engage the teeth of the ratchet wheel 29 and to rotate it counterclockwise as the lower end of the free leg 44 moves toward the right. The formed bimetal strip is so constructed that the metal with the high coefficient of expansion is on the inside whereby the lower end of the leg 44 will move toward the right when the strip is heated.

There is a resistance type heater 46 mounted on the panel between the legs of the bimetal strip 41. The heater 46 is connected in parallel with the blower B, by the leads 47, 48 and 49. There is a spring type snap action switch 50 interposed between the leads 48 and 49 for controlling energization of the heater. There is a switch actuating rod 51 connected at one end to the switch 50 and at its other end to the lower free end of leg 44 of the bimetal strip, and as the lower end of leg 44 moves toward the right upon heating of the strip, the switch 50 is moved to a circuit breaking position, as shown in Fig. 5. The switch is returned, of course, to a closed position as the strip cools, and the bimetal strip therefore makes and breaks its own heater circuit and continues to cycle as long as the blower circuit is closed.

Also on the rear of the panel and to the right of the ratchet wheel 29 there is mounted a generally U-shaped assembly generally indicated at 52. Assembly 52 comprises a lower horizontal member 53 pivotally mounted on a pivot 54. Attached to the right end of member 53 is a vertical bimetal strip 55. Adjacent the upper end of strip 55 is a pivoted yoke 56 having right and left stops 56a and 56b. The yoke 56 is mounted for rotation on a screw 57 and it is frictionally retained in position by a spring washer 58. Attached to the left end of horizontal member 53 is a vertical and flexible pawl member 59, the upper free end of which is formed to engage the teeth of the ratchet wheel 29 when the assembly 52 is rotated counterclockwise on its pivot 54, to the position shown in Fig. 5.

Wound around the bimetal strip 55 is a resistance heating element 60 which is connected in parallel with the heat-producer H by leads 61 and 62. The heating element 60 is therefore energized whenever the heat-producer is in operation. The bimetal strip 55 is arranged with the metal having the highest coefficient of expansion on the right or outside whereby upon being heated its upper free end reacts against the left hand stop 56b of the yoke 56, as indicated in Fig. 4, to cause clockwise rotation of the assembly 52 and thereby movement of the upper end of pawl 59 out of engagement with the ratchet teeth. Upon deenergization of the heater 60, the upper free end of strip 55 will, upon cooling, engage the right hand stop 56a and cause counterclockwise rotation of the assembly 52 thereby moving the pawl 59 into engagement with the ratchet teeth, as indicated in Fig. 5.

*In operation*

Assuming that the heat-producer energizing or control circuit is completed upon heat demand by the space thermostat 13, the start of operation of the heat-producer and energization of the resistance heater 60 will be simultaneous. As the bimetal strip 55 warps upon being heated, the pawl 59 will be moved out of engagement with the teeth of ratchet wheel 29. When this occurs, the ratchet wheel 29 will be released and the wheel and switch actuating arm 29a will be rotated counterclockwise, as viewed from the rear of the panel by the return spring 30, thus permitting the closure of switch 22 and therefore the energization of the blower B. The time required for sufficient warping of the strip to effect the release of the ratchet wheel may be conveniently varied by rotational adjustment of the yoke 56. As the yoke 56 is adjusted in a clockwise direction, as viewed from the rear of the panel, the amount of warping of the strip 55 required to disengage the pawl will be increased and therefore the time interval will be increased.

Upon closure of the switch 22, the blower B, and the resistance heater 46 are energized. The lower free end of the bimetal strip 41 will warp toward the right until its heater circuit is broken at switch 50, whereupon it will cool to reclose its heater circuit and will continue to oscillate thus, breaking and making its own heater circuit, as long as the switch 22 is closed and therefore as long as the blower B is in operation. These oscillations or cycles will however, have no advancing effect upon the ratchet wheel 29 and its switch actuating arm 29a as long as the heat-producer circuit is closed and the resistance heater 60 maintains the heated and warped position of the bimetal strip 55 whereby the pawl 59 is held out of engagement. The switch 22 will therefore remain closed and the blower will continue to operate under these conditions.

When sufficient heat has been supplied to satisfy the space thermostat 12, it will open, breaking the circuit for the heat-producer H and the resistance heater 60. When this occurs, the bimetal strip 55 will cool and move the pawl 59 into engagement with the ratchet wheel 29. Thereafter the ratchet wheel will be advanced one tooth upon each oscillation of the bimetal strip 41 until the actuating arm 29a engages the switch 22 to open it thereby breaking the circuit for the blower B and the resistance heater 46. It will be noted that the ratchet advancing member 45 attached to the lower free end of bimetal strip 41 will be moved to a non-engaging position upon breaking of the circuit for heater 46, and that the ratchet wheel is free therefore, to return under the urging of spring 30 upon subsequent release by the pawl 59.

The time interval between cessation of operation of the heat-producer and the breaking of the blower circuit may be conveniently varied by positioning the frictionally retained ratchet wheel return stop 39. As the stop 39 is moved counterclockwise (Fig. 2) along the periphery of the dial 34, the return movement of the ratchet wheel, upon release, is increased, and therefore the advance of the wheel required from an increased return to a switch opening position will be greater.

While the system described has particular advantages in its illustrated use, it is to be understood that only slight and obvious changes are necessary to adapt the system to use in a space cooling system.

The foregoing description and accompanying drawings are intended to be illustrative, not limiting, the scope of the invention being set forth in the appended claims.

I claim:
1. In a heating system blower control in combination, an electrically operated blower, a heat- producer, means rendered operative upon energization of said blower to deenergize said blower after a predetermined interval of blower operation, and means responsive to the operation of said heat-producer to render said first mentioned means inoperative during operation of said heat-producer.

2. In a heating system blower control in combination, an electrically operated blower, a heat-producer, means responsive to the operation of said heat-producer for starting operation of said blower after a predetermined interval of operation of said heat-producer, means rendered operative upon energization of said blower to deenergize said blower after a predetermined interval of blower operation, said first mentioned means being further operative in response to operation of said heat-producer to render said second means inoperative during operation of said heat-producer.

3. In a heating system blower control in combination, an electrically operated blower, an energizing circuit for said blower, an electrically operated heat-producer, an energizing circuit for said heat-producer, a space temperature responsive heat demand switch controlling said heat-producer circuit, electrically operated means in said heat-producer circuit for starting operation of said blower, a predetermined interval after completion of said heat-producer circuit, electrically operated means in said blower circuit operative to deenergize said blower after a predetermined period of blower operation, said first mentioned means being further operative to render said second mentioned means inoperative when said heat-producer circuit is completed.

4. In a heating system blower control in combination, a heat-producer, an electrically operated blower, an energizing circuit for said blower, a normally closed switch controlling said circuit, a spring returned actuator movable against spring means to a position for opening said switch, means responsive to the operation of said blower for moving said actuator to a switch opening position after a predetermined interval of blower operation, movable stop means having a normal position for holding said actuator in a switch opening position, and means responsive to the operation of said heat-producer for moving said stop means to a position in which said actuator is released to permit closing of said switch.

5. In a heating system blower control in combination, an electrically operated heat-producer, an electrically operated blower, an energizing circuit for said blower, a normally closed switch controlling said circuit, a spring returned actuator movable against spring means to a position for opening said switch, means responsive to the operation of said blower for moving said actuator to a switch opening position after a predetermined interval of blower operation, latch means for normally holding said actuator in a switch opening position, and means responsive to the operation of said heat-producer for moving said latch means to a position to release said actuator and permit the closure of said switch after a predetermined period of operation of said heat-producer.

6. In a blower control for space conditioning systems in combination, an electrically operated blower, an energizing circuit for said blower, a spring closed switch for controlling said circuit, a spring returned switch actuator movable in a direction against spring pressure to open said switch, said actuator including a driven ratchet, an electrically operated timing device in said circuit having an oscillating member arranged to intermittently engage said ratchet to advance it in a switch opening direction, a movable pawl having a normal position for engaging said ratchet, a heat producer, and means responsive to the operation of said heat-producer to move said pawl to a non-engaging position.

7. In a blower control for space conditioning system in combination, an electrically operated blower, an energizing circuit for said blower, a normally closed spring pressed switch for controlling said circuit, a spring returned switch actuator movable in a direction against spring pressure to open said switch, said actuator including a ratchet movable therewith, adjustable stop means for varying the return of said ratchet and actuator, an electrically operated timing device in said circuit having an oscillating member adapted to intermittently engage said ratchet to advance it in a switch opening direction, a movable pawl normally engaging said ratchet, a heat-producer, and means responsive to the operation of said heat-producer to move said pawl to a non-engaging position.

8. In a blower control for space conditioning systems in combination, an electrically operated blower, an energizing circuit for said blower, a normally closed spring pressed switch controlling said circuit, a spring returned actuator movable against spring means in a direction for opening said switch, electrically operated means in said blower circuit for moving said actuator to a switch opening position after a predetermined interval of blower operation, said means including movable stop means having a normal position for holding said switch in an open position, an electrically operated heat-producer, an energizing circuit for said heat-producer, a space thermostat controlling said circuit, and electrically operated means in said circuit for moving said stop means to a switch releasing position after a predetermined interval of operation of said heat-producer, said last mentioned electrically operated means including adjustable lost motion means for varying the interval between closure of said heat-producer circuit and the release of said blower circuit switch.

9. In a blower control for space conditioning systems in combination, an electrically operated blower, an energizing circuit for said blower, an electrically operated timing device in said circuit operative to break said circuit after a predetermined period of blower operation, an electrically operated heat-producer, a circuit for said heat-producer, a resistance heater in said heat-producer circuit, a thermostatic element adjacent said resistance heater, and means having a connection with said thermostatic element and being movable thereby in response to an increase in temperature to a position for rendering said timing device ineffective to break said blower circuit.

10. In a blower control for a space conditioning system in combination, an electrically operated blower, a circuit for said blower, a normally closed switch controlling said circuit, a ratchet, a member movable with said ratchet and adapted to engage said switch to move it openward as said ratchet is advanced a predetermined amount in one direction, spring means for urging said ratchet in an opposite direction, a thermostatic element having a free end adapted to engage said ratchet to advance it toward a switch opening position in response to an increase in temperature, a resistance heater for said thermostatic element, an energizing circuit for said heater in parallel with said blower circuit, a switch in said parallel circuit, means operatively connected to said free end of said thermostatic element for opening said heater circuit switch as said free end moves in one direction in response to an increase in temperature, and for closing it as said free end moves in an opposite direction upon cooling, a pawl normally engaging said ratchet to prevent the return thereof whereby it may be advanced step by step to a switch opening position, a heat-producer, and means responsive to the operation of said heat-producer to move said pawl to a non-engaging position with respect to said ratchet.

11. In a blower control of the kind described, a blower control switch, a switch actuator including a ratchet movable therewith, spring means for urging said actuator and ratchet in a switch closing direction, a thermostatic element having means associated therewith for engaging said ratchet to move it one tooth in a switch opening direction in response to an increase in temperature, an electrically operated heater for said thermostat, circuit connections for said heater through said control switch, means associated with said thermostat for breaking said heater circuit connections as said thermostat moves in response to heat, and for completing these connections as said thermostat moves opositely upon cooling, a pivoted pawl for engaging said ratchet whereby said actuator may be intermittently advanced in a switch opening direction, and a second thermostat having an operative connection with said pawl and arranged to rotate said pawl to a non-engaging position in response to an increase in temperature, and oppositely toward an engaging position in response to a decrease in temperature.

12. In a device of the class described, a blower control switch, a switch actuator including a ratchet movable therewith, spring means for urging said actuator and ratchet in a switch closing direction, adjustable stop means for varying the limit of travel of said ratchet and actuator in a switch closing direction, a thermostatic element having means associated therewith for engaging said ratchet to move it one tooth in a switch opening direction in response to an increase in temperature, an electrically operated heater for said thermostat, circuit connections for the energization of said heater under the control of said control switch, means associated with said thermostat for breaking said heater circuit connections as said free end moves in one direction in response to heat, and for completing these connections as said thermostat moves oppositely upon cooling, a pivoted pawl for engaging said ratchet whereby it may be advanced step by step to a switch opening position, a second thermostat having an operative connection with said pawl and arranged to rotate said pawl to a non-engaging position in response to an increase in temperature and oppositely to an engaging position upon a decrease in temperature, a second electrically operated heater for said second thermostat and circuit connections for the energization of said second heater independent of said control switch.

CLIFTON A. COBB.

(No references cited.)